March 27, 1934.  J. M. WILLEM  1,952,698
BUTTER
Filed June 12, 1933
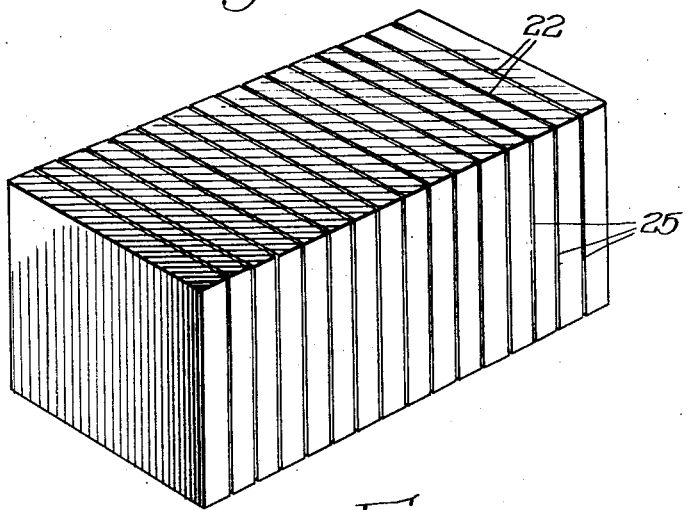
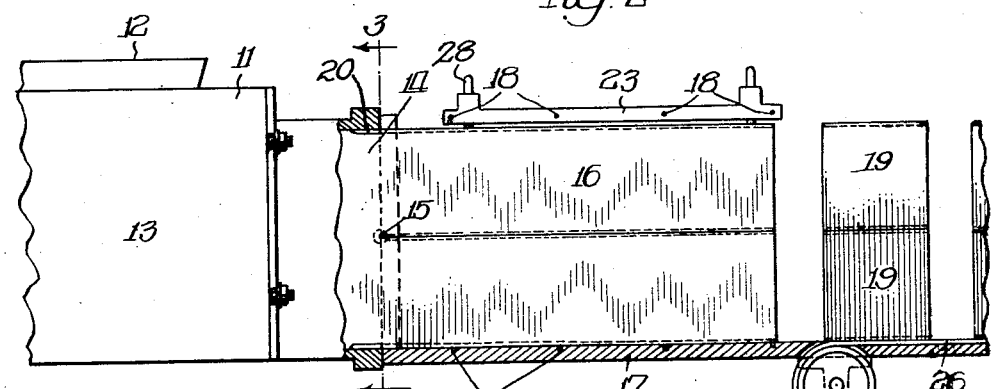
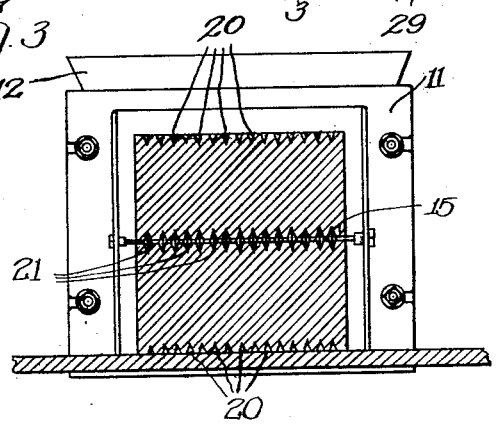
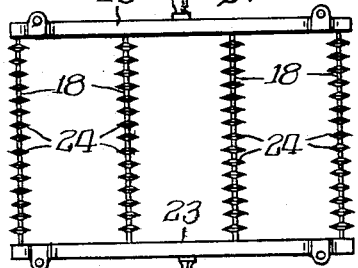
Inventor.
John M. Willem,
By Cromwell, Greist & Warden.
attys Patented Mar. 27, 1934

1,952,698

UNITED STATES PATENT OFFICE 1,952,698

BUTTER

John M. Willem, Evanston, Ill., assignor to Stack-Goble Advertising Agency, Chicago, Ill., a corporation of Illinois Application June 12, 1933, Serial No. 675,392

4 Claims. (Cl. 31—5)

The present invention relates to butter which is scored or marked so that the same may be readily cut into fixed units of quantity and the method and means for producing the same.

It is desirable to provide some means so that consumers of butter may cut an accurately measured quantity from a brick thereof without weighing or measuring equipment. The attempt has been made to divide butter bricks into relatively small pieces and separate the same with slip sheets, such as wax paper, for the purpose of providing predetermined quantities of butter for convenient use. This method is not satisfactory, however, for a number of reasons, one of the principal reasons being the expense in packaging.

A further attempt to provide a measuring means for butter or other plastic food products has been the imprinting of markings on the wrapper. The use of a marked wrapper, however, is not satisfactory because the cutting operation is messy from the standpoint of the user and for the further reason that if the marking is placed upon the wrapper which comes immediately in contact with the product then that wrapper must be accurately centered during the packaging operation to be of any value, which operation is expensive and impracticable from a manufacturing standpoint. If, on the other hand, such markings are placed on an outside container they are of little value as the consumer must cut through the outside container which is an inconvenient operation and for measuring small quantities is obviously inaccurate and impracticable.

The present invention contemplates the scoring or marking of butter or other plastic food material to indicate predetermined quantities so that the consumer upon removing the wrapping by use of an ordinary knife may easily cut a predetermined quantity, such for instance, as a tablespoonful. The method of accomplishing this result is simple and unique.

A preferred form of the invention is shown in the accompanying drawing. It is to be understood, however, that the drawing does not purport to present a device drawn to scale or an accurate commercial device but is schematic and purely illustrative.

Referring to the drawing,

Fig. 1 is an enlarged view in perspective of a pound cake showing the scorings or markings of a predetermined quantity of butter or other plastic substance which it is desired to measure;

Fig. 2 is a view in side elevation with portions broken away of a butter extruding, cutting and marking device;

Fig. 3 is a sectional view taken on the line 3—3 of Fig. 2, and

Fig. 4 is a view in top elevation of the vertical cutting and marking rack.

Referring to Fig. 2, it will be observed that this figure includes an extruding device 11 consisting of a hopper or other type of receiving member 12 having a chamber 13 into which the plastic material is fed and from which it is extruded through the opening 14. Within the chamber 13 pressure is exerted upon the plastic material therein by means of appropriate mechanism which is generally well known in the art and is, therefore, not shown.

Referring to Fig. 3, it will be observed that extending horizontally across the center of the opening 14 is a cutting wire 15 which cuts the extruded cake in two rectangularly shaped halves. The extruded butter 16, which is shown in Fig. 2, rests upon a table or platform 17 where it is cut vertically by means of the rack shown in Fig. 4, this rack having a plurality of cutting wires indicated by the reference numeral 18. The platform 17 is provided in its upper surface with a plurality of spaced transversely extending recesses 29 to receive the cutting wires of the rack. The rack 23, shown in Figs. 2 and 4, is passed vertically down through the extruded cake so as to cut the cake into pound prism-shaped sections, indicated by the reference numeral 19 in Fig. 2. These sections then pass on to a traveling belt to be carried away for wrapping.

A variety of means may be employed for passing the rack 23 through the cake and such means are generally understood in the trade and vary with different types of machines or, for that matter, the rack may be operated by hand. For the purpose of illustration handles 27 are shown attached to opposite sides of the rack which is slidably mounted on a plurality of upright members 28.

As appears from Fig. 3, a plurality of scoring projections, indicated by the reference numeral 20, extend inwardly from the upper and lower faces of the extruding member and the cutting wire 15 has fastened thereon a plurality of scoring projections 21 so that as the cake is extruded and cut, as shown in Fig. 2, it is scored longitudinally on its top and bottom surfaces and also on both sides of the center surfaces which result from the extruded cake being cut by the wire 15.

Referring back to Fig. 1, the scoring performed by the scoring members 20 and 21 is indicated by the score marks 22. The rack 23 is provided with a plurality of cutting wires 18 to which are secured scoring members 24 which score the plastic material at the places indicated in Fig. 1 by the reference numeral 25 as the rack is passed downwardly through the butter to cut it into pound cakes.

Since the scoring lines 22 and 25 are in the same plane it is obvious that merely by passing a knife through the butter so as to follow the scoring lines a predetermined quantity will be cut off which is measured by the spacing of the scoring members on the machine.

It is obvious that the scoring lines will appear on four faces of the brick so that no matter what position it may be placed in a scoring line appears to guide the consumer.

In the operation of the device the cake is extruded a predetermined distance and is then cut and the second scoring operation is performed by the member 23. It is obvious that in view of the nature of the device it is a comparatively simple matter to so adjust the mechanism that the scores 22 and 25 are on four sides and in the same plane. After the butter has been scored it is then placed on to a traveling belt 26 and is ready for wrapping.

In general practice, in the marketing of butter, lard or similar plastic food products, it will be desirable to arrange the scoring members so that they measure off in units of tablespoonfuls, the unit generally used in cooking, and since there are approximately sixteen tablespoonfuls to one pound and a pound is the usual unit sold, there are shown in Fig. 1 markings so as to provide sixteen markings to the brick.

The scoring members 20 may vary in size and configuration dependent on the type of score desired and the scoring members 21 and 24 will conform in size and configuration to scoring members 20 to give a scoring effect the same as those of the members 20.

The method of producing the scoring is unique in that it requires only the standard operations performed upon standard machines in forming and cutting bricks of butter and yet, due to the arrangement of the scoring members, assures scoring on all faces; likewise it provides a type of marking which is effective, accurate and convenient.

Th provision of a brick of butter with markings, such as scorings, for measuring purposes, is highly desirable from the standpoint of the user for the reason that ordinarily the housewife or the cook, if the butter is hard as for instance when it comes from a cold ice box, must permit it to stand to soften it in order to be able to measure a level tablespoonful, or a number of tablespoonfuls. This consumes time and is a messy, and wasteful operation. On the other hand, by the use of a scored brick, no matter how hard the butter may be a knife may be passed through it and the desired amount quickly and accurately measured and cut off and the butter, in its solid condition, returned to the ice box. This feature is highly desirable not only from the standpoint of convenience but also because repeated softening of a cake of butter tends toward spoilage and the absorption of undesirable odors which gives it a bad taste. In addition, the general shape of the brick is destroyed by the old method in removing therefrom for cooking purposes and table purposes quantities with a spoon, whereas, by the present method its shape is maintained and a single brick may be used.

I claim:

1. The method of forming and scoring plastic food materials which consists in extruding the same to form a prism-shaped mass, scoring the mass longitudinally as it passes out of the extruding mechanism, and passing a cutting and scoring member vertically through the extruded mass to subdivide the same and score the subdivided parts.

2. The method of forming and scoring butter bricks which consists in extruding the butter in the form of a prism-shaped mass, and simultaneously scoring the mass longitudinally on its top and bottom surfaces as it passes out of the extruding mechanism and passing a cutting member having scoring means on the cutting instrumentalities vertically through said mass.

3. A forming, cutting and scoring means for butter comprising an extruding member, means at the top and bottom surfaces of the extruding opening to form longitudinal scores in the butter as it is passed therethrough, a cutting means consisting of a frame having cutting members extending across the same, said cutting members having projections thereon to score the butter as said cutting mechanism is passed therethrough.

4. The method of forming and scoring butter bricks which consists in extruding the butter in the form of a prism shaped mass to produce longitudinal parallel scorings on the mass as it is extruded, positioning the extruded mass in relation to a cutting mechanism having scoring means on cutting members thereof, and passing the cutting means vertically through said mass to subdivide and score the same with scorings in the same planes and at right angles to the longitudinal scorings produced in extruding the mass.

JOHN M. WILLEM.